United States Patent
Ban et al.

(10) Patent No.: US 6,970,802 B2
(45) Date of Patent: Nov. 29, 2005

(54) THREE-DIMENSIONAL MEASURING DEVICE

(75) Inventors: Kazunori Ban, Yamanashi (JP); Ichiro Kanno, Yamanashi (JP)

(73) Assignee: Fanuc LTD, Yamanashi (JP)

(*) Notice: Subject to any disclaimer, the term of this patent is extended or adjusted under 35 U.S.C. 154(b) by 0 days.

(21) Appl. No.: 10/740,567

(22) Filed: Dec. 22, 2003

(65) Prior Publication Data
US 2004/0133382 A1 Jul. 8, 2004

(30) Foreign Application Priority Data
Dec. 20, 2002 (JP) .............................. 2002/369809

(51) Int. Cl.[7] .......................... G01C 17/00; G05B 19/18
(52) U.S. Cl. ..................... 702/153; 702/150; 700/59; 700/61
(58) Field of Search ........................... 702/153, 150, 702/152; 700/192, 59, 61, 250, 253, 258, 700/259

(56) References Cited

U.S. PATENT DOCUMENTS 6,236,896 B1 * 5/2001 Watanabe et al. ............. 700/37

FOREIGN PATENT DOCUMENTS

JP 60-15780 1/1985
JP 10-63317 3/1998

OTHER PUBLICATIONS

Notification of Grounds for Rejection (Office Action) and English translation.

* cited by examiner

Primary Examiner—John Barlow
Assistant Examiner—Meagan S Walling
(74) Attorney, Agent, or Firm—Staas & Halsey LLP

(57) ABSTRACT

Three-dimensional measurement capable of reducing an error in coupling robot and sensor coordinate systems and adverse effects of backlash in a robot. A position/orientation of the robot for obtaining a measurement value on the sensor coordinate system is set beforehand with a workpiece positioned at a reference position. Then, the robot is moved to a preparatory measurement position, a preparatory measurement for the workpiece positioned at an arbitrary position is performed (SV1), and based on a measurement result, a main measurement position is calculated (SV2). Next, an auxiliary position is determined (SV3), which serves as a start position from which a movement to the main measurement position can be made without making a reversal of respective axes. The robot is moved to the auxiliary position (SV4), and to the main measurement position (SV5), and a measurement for the workpiece is made and a measurement result is stored (SV6).

15 Claims, 7 Drawing Sheets

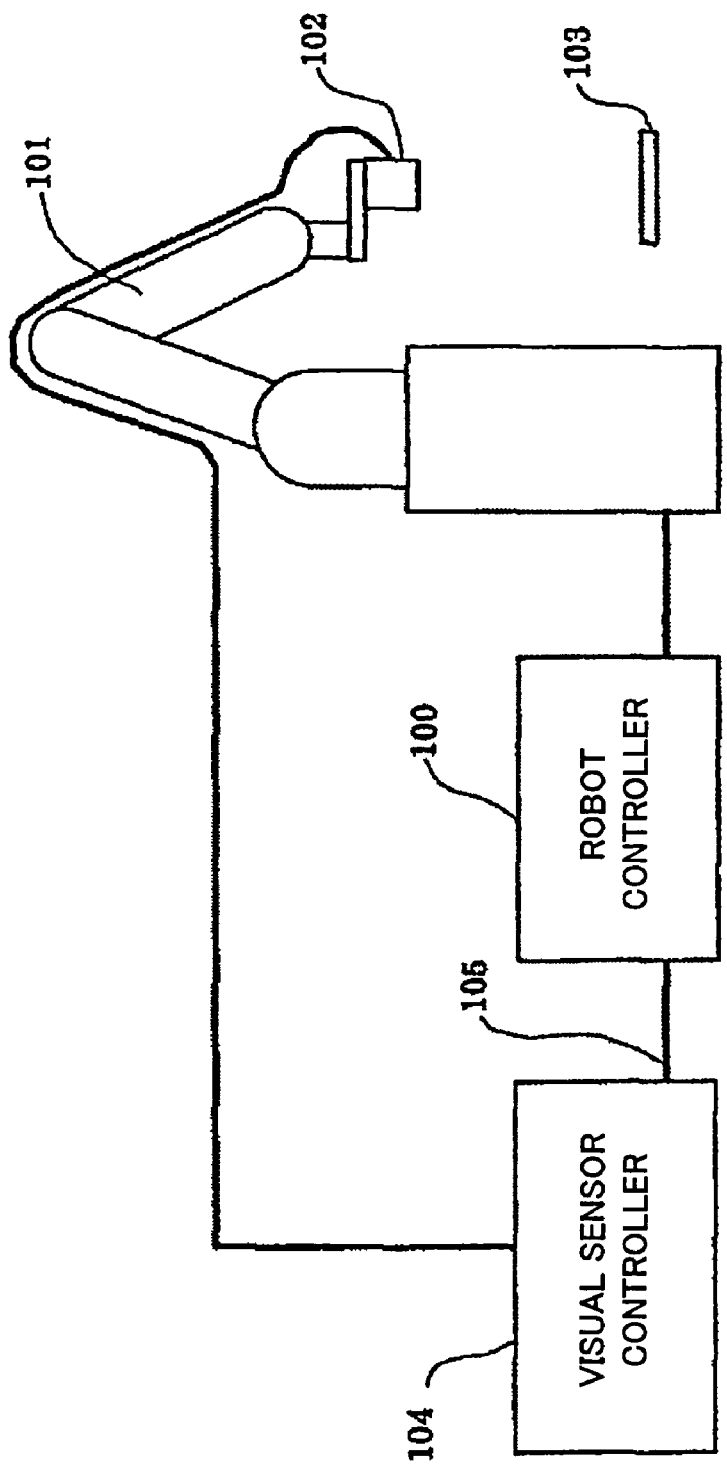

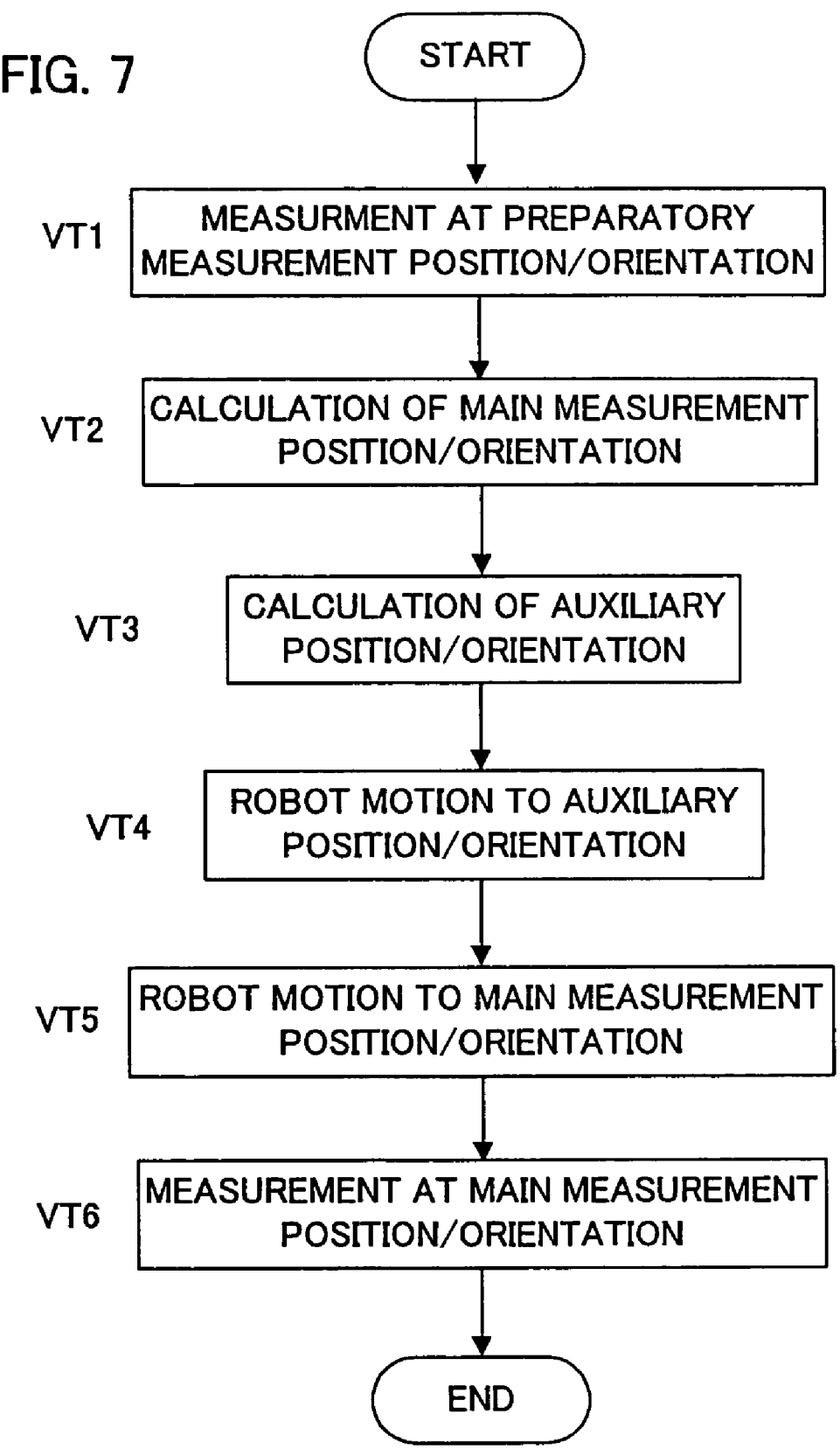

THREE-DIMENSIONAL MEASURING DEVICE

BACKGROUND OF THE INVENTION

1. Field of the Invention

The present invention relates to a device, having a three-dimensional visual sensor mounted to a robot, for three-dimensional measurement of an object, which device is utilized for an application performing a three-dimensional measurement of a workpiece for instance for workpiece ejection, workpiece machining, etc.

2. Description of Related Art

In a three-dimensional measurement of an object such as a workpiece using a three-dimensional visual sensor mounted to a robot, a sensor coordinate system must be coupled in advance with a robot coordinate system. An exemplified method therefor is disclosed in JP 10-63317A relating to a "method for coupling coordinate systems in a robot and visual sensor system."

In practice, however, an accurate coupling is generally quite difficult to achieve due to various reasons, so that an inevitable coupling error may be caused. Due this coupling error, a measurement error may be caused in a measurement performed while changing the position/orientation of robot, which error is unnegligible depending on application.

Aside from the aforementioned cause, due to the presence of backlash in the robot, a robot motion can cause a minute positional variation depending on the directions (motor rotational directions) in which articulated axes of the robot are operated. In some applications, a measurement error produced by such minute variation in robot position cannot be negligible.

SUMMARY OF THE INVENTION

The present invention provides a three-dimensional measuring device capable of reducing adverse effects of the coordinate system coupling error and the robot position error due to backlash, thus permitting a robot to perform a highly accurate operation.

The three-dimensional measuring device of the present invention is provided for measuring a position/orientation of an object using a three-dimensional visual sensor mounted on a robot, and comprises: storing means for storing a target relative measurement position/orientation of a visual sensor and an object in advance; control means for controlling the robot to position the visual sensor at a preparatory measurement position/orientation where a preparatory measurement is performed by the visual sensor to obtain a relative position/orientation of the visual sensor and the object; and determining means for determining a main measurement position/orientation of the visual sensor at which a relative position/orientation of the visual sensor and the object coincides with the target relative measurement position/orientation based on the relative position/orientation obtained by the preparatory measurement and the target relative measurement position/orientation stored in said storing means, wherein said control means controls the robot to position the visual sensor at the main measurement position/orientation determined by said determining means where a main measurement is performed by the visual sensor to obtain a relative position/orientation of the visual sensor and the object.

The determining means may determine whether or not an error between the relative position/orientation obtained by the main measurement and the target relative position/orientation is within a predetermined allowable range, and when it is determined that the error is not within the allowable range, said determining means may update the main measurement position/orientation of the visual sensor at which a relative position/orientation of the visual sensor and the object coincides with the target relative position/orientation based on the relative position/orientation obtained by the main measurement and the target relative position/orientation stored in said storing means, and said control means may control the robot to reposition the visual sensor at the updated main measurement position/orientation where an updated main measurement is performed by the visual sensor. In this case, the update of the main measurement position/orientation and repositioning of the visual sensor may be repeatedly performed until the error is within the allowable range. Alternatively, the update of the main measurement position/orientation and the repositioning of the visual sensor may be repeatedly performed a set number of times.

The above three-dimensional measuring device may further comprise designating means for designating the preparatory measurement position/orientation of the visual sensor in advance. Further, the preparatory measurement position/orientation may be determined based on a result of measurement performed by a visual sensor other than said visual sensor.

The control means may control the robot to position the visual sensor at an auxiliary position/orientation before positioning the visual sensor at the preparatory or main measurement position/orientation, said auxiliary position/orientation being determined such that a motion of the visual sensor from the auxiliary position/orientation to the preparatory or main measuring position/orientation is realized by rotating all of drive motors of the robot unidirectionally. In this case, the three-dimensional measuring device is made able to suppress adverse effects of backlash to the measurement accuracy, which effects vary depending on the operating direction of articulated axes of the robot.

BRIEF DESCRIPTION OF THE DRAWINGS

FIG. 1 is a view for explaining a positional relation among a robot, a sensor, and a workpiece;

FIG. 7 is a flowchart of another example of modified processing procedures in the embodiment, in which adverse effects of backlash in a robot axis are suppressed.

DETAILED DESCRIPTION

Figure 2B:
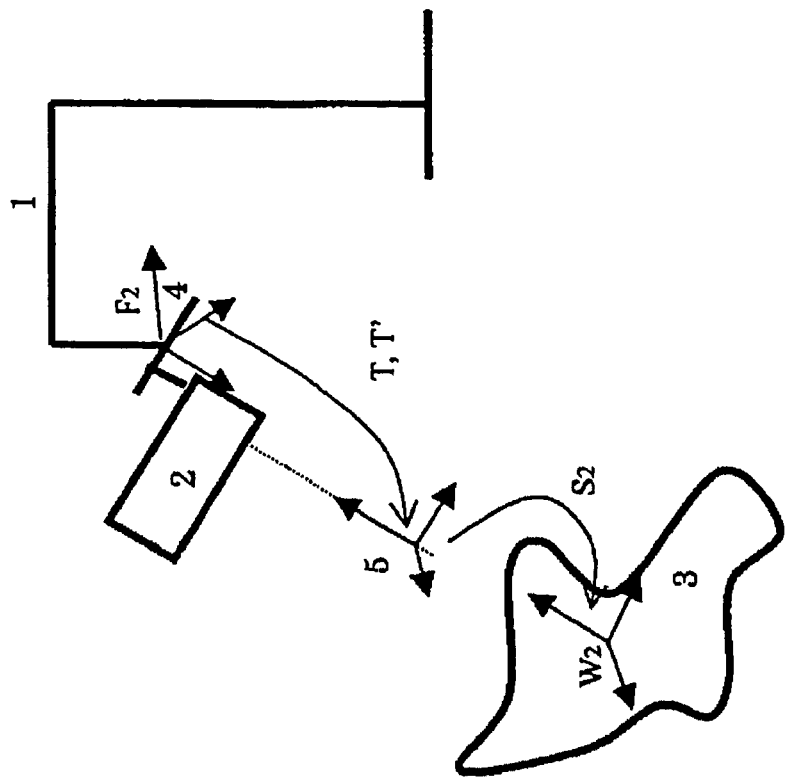
FIG. 2b is a view showing a relation among the workpiece positioned at an ordinary position, the visual sensor coordinate system, etc.

FIG. 1 is a view for explaining the overall configuration of a three-dimensional measuring device according to an embodiment of this invention. As shown in FIG. 1, the three-dimensional measuring device comprises a three-dimensional visual sensor comprised of a sensor head 102 and a visual sensor controller 104, and a robot 101 connected to a robot controller 100 and having an arm end mounted with the sensor head 102 of the visual sensor. The visual sensor controller 104 is connected with the sensor head 102 and also connected through a communication line 105 with the robot controller 100.

Reference numeral 103 denotes an object (for instance, a workpiece) whose position/orientation is to be measured by the visual sensor. Although illustration is omitted, a teaching pendant is connected to the robot controller 100 as is well known, through which various commands may manually be input. This manual input includes jog feed in the robot, input of a measurement command for the visual sensor, etc. The robot 101 is mounted with a desired tool (such as hand, welding gun, etc., not shown) that varies depending on application.

Here, it is assumed that a calibration for the visual sensor has been completed using any well-known appropriate method, and a coupling between a sensor coordinate system on which the visual sensor is based and a coordinate system set for the mechanical interface of the robot has also been completed using a method described in JP 10-63317A for instance.

Thus, a condition has already been established in which a measurement of the workpiece 103 by the visual sensor can be made by delivering a command from a program taught beforehand to the robot controller 100 to the visual sensor controller 104 or by delivering a manually input command to the same. Meanwhile, the sensor head 102 is a conventional one comprising a laser-slit light projector, a video camera (reflection light detector), etc., and the visual sensor controller 104 is also a conventional one comprising a light detection signal processor, memories, etc. Their constructions and functions do not directly relate to this invention, and hence detailed explanations thereof will be omitted.

Figure 2A:
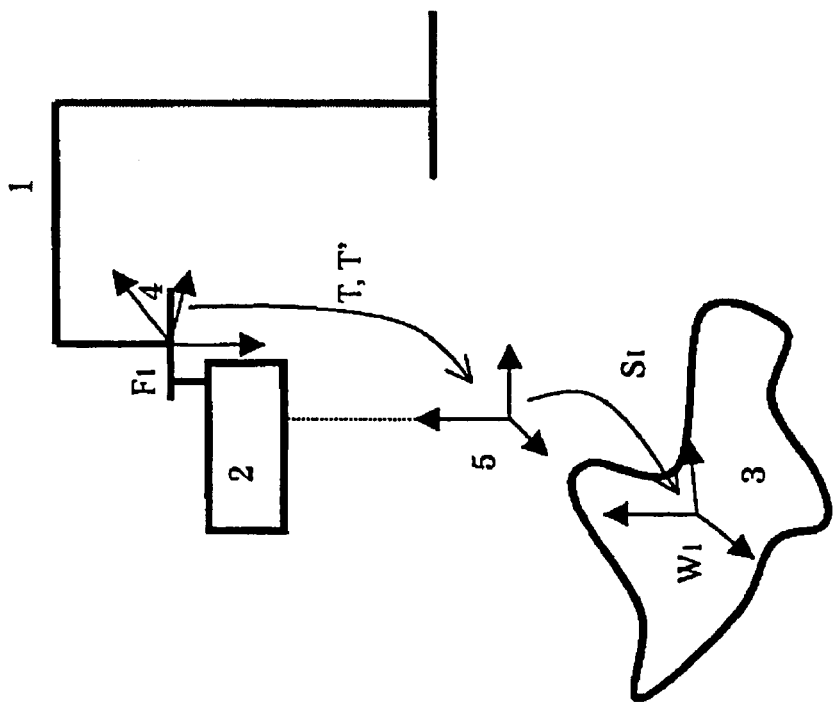
FIG. 2a is a view showing a relation among a workpiece positioned at a reference position, the visual sensor coordinate system, etc.

In this embodiment, using the aforementioned device, (a) measurement results obtained with the workpiece 103 placed at a reference position/orientation are set beforehand, together with a position/orientation of the robot 101 (hereinafter referred to as "operation position/orientation of the robot") for producing some effect (varying depending on the application, such as grasping by the hand), and based on the thus set measurement results and the operation position/orientation, (b) an attempt is made to realize the robot position/orientation for producing the just-mentioned effect, even if the position/orientation of the workpiece 103 arbitrarily changes from the reference position. In the following explanations, FIGS. 2a and 2b will be referred as required, in which reference numerals 1–3 denote a "robot (robot arm)," "visual sensor (sensor head)" and "workpiece" (corresponding to the robot 101, sensor head 102, and workpiece 103 in FIG. 1), and reference numerals 4 and 5 denote "robot mechanical interface coordinate system" and "sensor coordinate system," respectively.

It is assumed here that [T] denotes a "true coupling relation" from the mechanical interface coordinate system 4 in the robot to the sensor coordinate system. In general, a coupling relation [T'] that is set at the time of the previously mentioned coordinate system coupling is not coincide with the [T], and has some error. In this specification, symbol [ ] is used to indicate a four-low, four-column matrix representing the coordinate system conversion, the position/orientation of the robot 1, etc. The following are abbreviated representations of them:

[T]=True coupling relation from the mechanical interface coordinate system to the sensor coordinate system

[T']=Set coupling relation from the mechanical interface coordinate system to the sensor coordinate system The following are abbreviated representations of amounts (refer to FIGS. 2a and 2b):

[W1]=Reference position/orientation of the workpiece 3

[F1]=Position/orientation of the mechanical interface coordinate system 4 when the robot 1 is at an arbitrary measurement position/orientation (hereinafter referred to as "measurement position 1")

[S1]=Position/orientation of the workpiece 3 represented by the sensor coordinate system 5 and measured when the robot 1 is at measurement position 1

[P1]=Operation position/orientation of the robot 1 represented by the mechanical interface coordinate system 4 (i.e., position/orientation of the mechanical interface coordinate system 4) for the workpiece 3 at its reference position/orientation

[W2]=Position/orientation of the workpiece 3 arbitrarily deviated from the reference position/orientation In a special case, the relation of [W2]=[W1] is satisfied.

[F2]=Position/orientation of the mechanical interface coordinate system 4 when the robot 1 is at an arbitrary measurement position/orientation (hereinafter referred to as measurement position 2)

In a special case, the relation of "measurement position 1=measurement position 2" is satisfied.

[S2]=Position/orientation of the workpiece 3 represented by the sensor coordinate system 5 and measured when the robot is at the measurement position 2

[P2]=Operation position/orientation of the robot 1 for the workpiece 3 whose position/orientation is deviated from its reference position/orientation The following relations (A1) to (A3) are fulfilled between the aforementioned amounts and the true coupling relation [T] from the mechanical interface coordinate system of the robot to the sensor coordinate system:

$$[W1]=[F1][T][S1] \tag{A1}$$

$$[W2]=[F2][T][S2] \tag{A2}$$

$$[P2]=[W2][W]^{-1}[P1] \tag{A3}$$

In actual, however, the true coupling relation [T] is unknown, whereas the set coupling relation [T'] generally includes an error, as described above. For [T'], the relations (A1)–(A3) for [T] are replaced by the following relations (B1)–(B3):

$$[W1']=[F1][T'][S1] \tag{B1}$$

$$[W2']=[F2][T'][S2] \tag{B2}$$

$$[P2']=[W2'][W1']^{-1}[P1] \tag{B3}$$

where [W1'], [W2'], and [P2'] satisfying the relations (B1)–(B3) are substitutes for [W1],[W2], and [P2].

In order to establish a condition to perform an accurate robot operation, the relation of [P2']=[P2] must be fulfilled, and hence the following relations must be satisfied:

$$[W2'][W1']^{-1}=[W2][W1]^{-1}$$

$$[F2][T'][S2][S1]^{-1}[T']^{-1}[F1]^{-1}=[F2][T][S2][S1]^{-1}[T]^{-1}[F1]^{-1}$$

One of conditions to always satisfy these two relations is: $[S2][S1]^{-1}=[I]$ (unit matrix), i.e., $[S2]=[S1]$.

This indicates that, even if a coupling error is present and even if the workpiece 3 is positioned to be deviated from its reference position/orientation, an accurate robot operation can be achieved by maintaining the proper relative position/orientation between the visual sensor (sensor head 2) and the workpiece 3. In order to carry out a robot operation with high accuracy based on a visual sensor output, therefore, the position/orientation of the robot 1 must be adjusted to match the position/orientation of the workpiece 3. In other words, the measurement position 2 must be determined in dependence on the position/orientation of the workpiece 3, so that "the relative position/orientation at the measurement position 1 between the visual sensor and the workpiece 3" is recreated at the measurement position 2.

In this regard, the "measurement position 1" can be considered as belonging to the [P1], i.e., the "operation position/orientation of the robot for the workpiece 3 at the reference position [W1]." Thus, based on the measurement position 1 set beforehand, the desired measurement position 2 for the workpiece 3 at an arbitrary position/orientation can be determined in accordance with the relation (B3).

The following is an explanation of procedures for actual application of the above-mentioned principle.

First, as a preparation, the workpiece 3 is placed at an appropriate reference position/orientation [W1] (hereinafter simply referred to as reference position [W1], and this applies to other matrices), the robot 1 is positioned at the operation position [P1] (e.g., suited for workpiece grasping) for the workpiece 3 placed at the reference position [W1], and the position [P1] is stored in a memory of the robot controller 100. Then, the robot 1 is positioned at the position [F1] corresponding to the "measurement position 1" for the workpiece 3 placed at the reference position [W1], and the position [F1] is stored in the memory of the robot controller. Subsequently, at the robot position [F1], a measurement is performed using the visual sensor to measure the position [S1] of the workpiece 3 located at the reference position [W1]. The position [S1] is representation data on the sensor coordinate system, and thus serves also as data representing the "relative position/orientation between the visual sensor and the workpiece 3."

Figure 3:
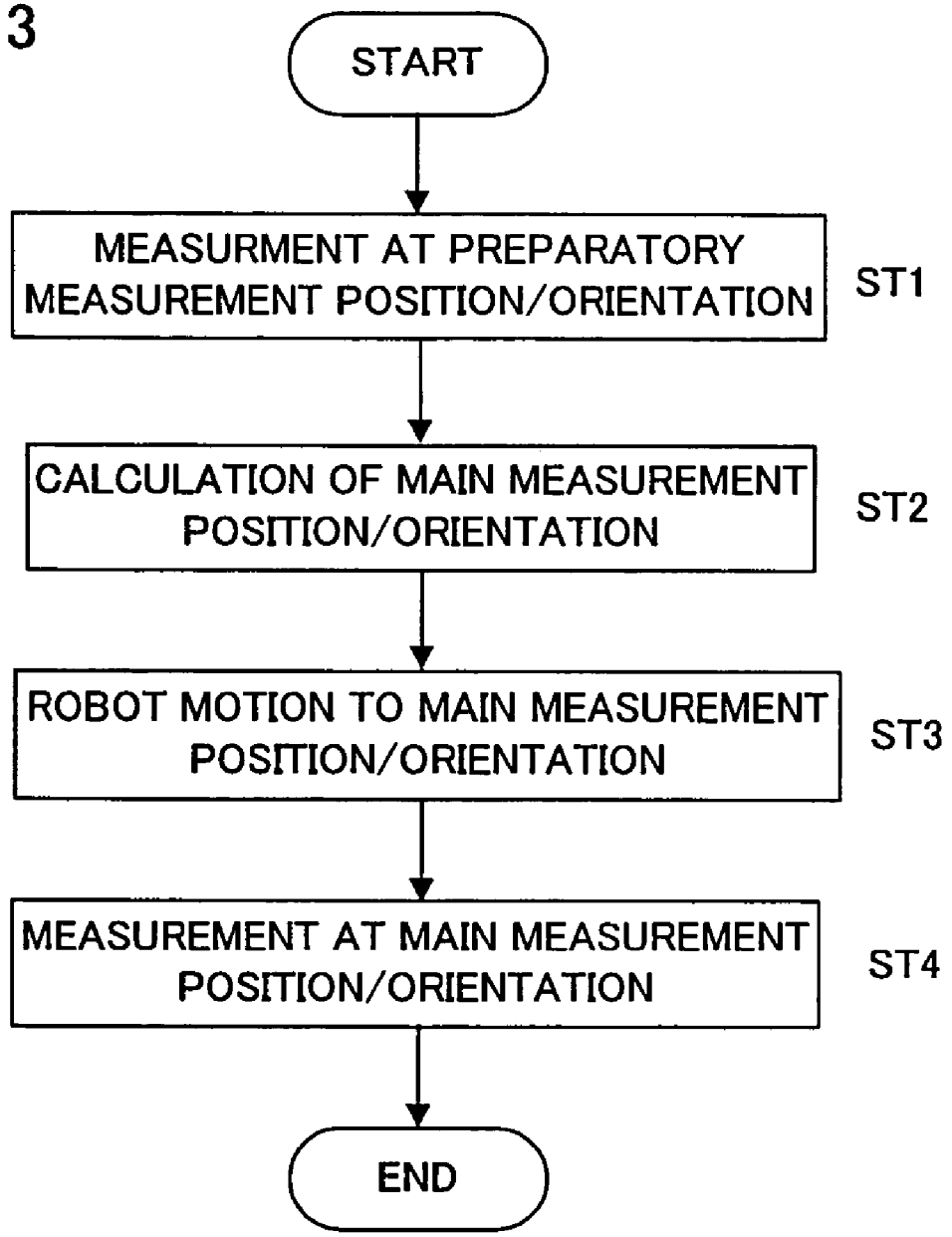
FIG. 3 is a flowchart of basic processing procedures in an embodiment.

After completion of the preparation, procedures shown in the flowchart of FIG. 3 are executed for the workpiece 3 located at an arbitrary position [W2]. Main points of respective steps are as follows:

In Step ST1, the robot is moved to a preparatory measurement position [F2], and a preparatory measurement is performed for the workpiece located at an arbitrary position [W2]. The preparatory measurement position is arbitrary in general, but is preferably the one at which a measurement result close to [S1] can be obtained. In view of this, such a preparatory measurement position may be set beforehand to the robot controller in accordance with a range of actual robot position. The preparatory measurement position may be determined based on a result of measurement performed by a visual sensor other than the above-mentioned visual sensor (sensor head 2).

If it is assumed that a measurement result at the preparatory measurement position can be represented by [S2], the following formulae can be derived from the aforementioned formulae (B1)–(B2):

$$[W1']=[F1][T][S1] \quad (B11)$$

$$[W2']=[F2][T][S2] \quad (B12)$$

where [W2'] calculated from formula (B12) indicates a position close to [W2].

In Step ST2, a main measurement position (a robot position for main measurement) is calculated, which will be referred to as [F21] (a first calculated main measurement position). By considering the [F1], which is the "measurement position 1," as an "operation position/orientation [P1] of the robot for the workpiece 3 positioned at the reference position [W1]," formula (B3) can be modified as follows:

$$[F21]=[W2'][W1']^{-1}[F1] \quad (B13)$$

This provides the main measurement position which is to be determined in Step ST2, and stored in the robot controller.

In Step ST3, the robot is moved to the main measurement position determined at Step ST2.

In Step ST4, a measurement for the workpiece is performed at the main measurement position, a measurement result [S21] is stored in a memory of the visual sensor controller, and the robot controller is notified of the measurement result, whereupon the processing is completed. With the thus obtained measurement result [S21], an error in coordinate system coupling is considerably reduced. In the robot controller, using the robot position at which [S21] was obtained, the operation position/orientation [P2] of the robot (e.g., the robot position suited to grasping) for the workpiece located at an arbitrary position [W2] is calculated in accordance with the following formulae:

$$[W21]=[F21][T][S21] \quad (B12)$$

$$[P21]=[W21][W1']^{-1}[P1] \quad (B13)$$

Figure 4:
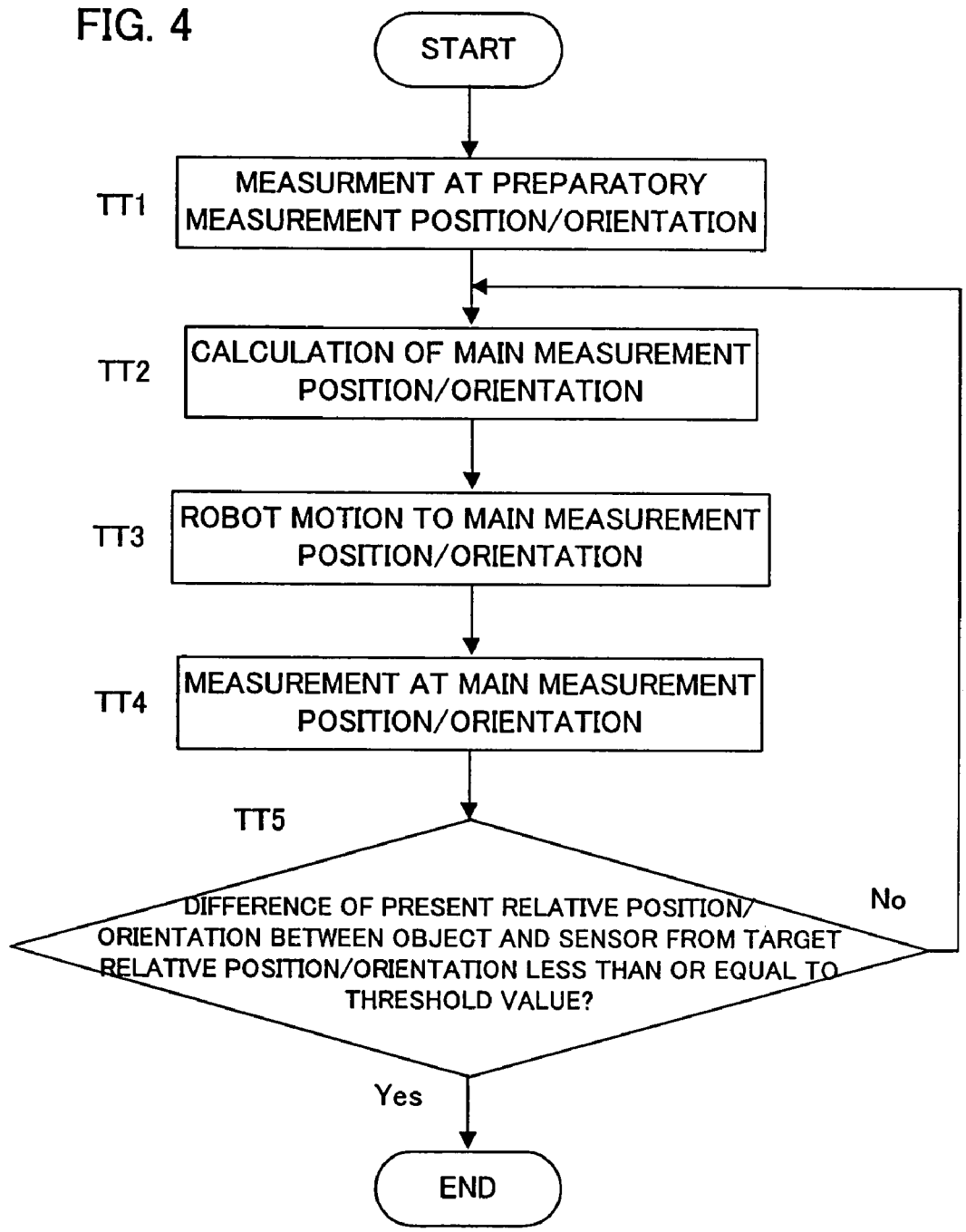
FIG. 4 is a flowchart of an example of modified processing procedures in the embodiment, in which a main measurement position is repeatedly calculated.

In the above, a basic type of the present embodiment has been described. The main measurement position determined in the basic type can be regarded as a "further preparatory measurement position" which is the first main measurement position. In this case, the next measurement position/orientation (main measurement position/orientation) can be determined, using the further preparatory measurement position and a measurement result at the first main measurement position and containing a slight error. Such redetermination can be repeated several times, if required. Procedures for the repeated determination is shown in the flowchart of FIG. 4. The following are main points of respective steps.

In Step TT1, as in the Step ST1, the robot is moved to a preparatory measurement position, and a preparatory measurement for the workpiece located at [W2] is performed. The preparatory measurement position may be set beforehand in the robot controller.

In Step TT2, basically as in the Step ST2, a measurement position (a robot position for main measurement) is calculated. Considering a possibility of repeating the Step ST2, the main measurement position determined by the i-th calculation is set as [F21i] (the i-th calculated main measurement position).

The main measurement position can be calculated by a method which is the same as the aforementioned one. Formulae (B12) and (B13) for the i-th calculation are as follows:

$$[W2i-1]=[F2i-1][T][S2i-1] \quad (B12i)$$

$$[F2i]=[W2i-1][W1']^{-1}[F1] \quad (B13i)$$

There are relations of [W20]=[W2'], [F20]=[F2], and [S20]=[S2]. The [F2i] in the formula, i.e., the main measurement position calculated by the i-th calculation at Step TT2, is stored in the robot controller.

In Step TT3, the robot is moved to the main measurement position determined at the Step TT2.

In Step TT4, a measurement for the workpiece is performed at the main measurement position, to obtain a measurement result [S2i] in which the coordinate system coupling error is more reduced than in the previous measurement result [S2i−1].

In Step TT5, the present "relative position/orientation between the object (workpiece) and the visual sensor" is compared with the predetermined "relative position/orientation between the object (workpiece) and the visual sensor=target relative position/orientation," to evaluate the error. More specifically, [S2i] and [S1] are compared, and whether the difference therebetween exceeds a predetermined threshold value is checked. If the threshold value is exceeded, the flow returns to Step TT2.

If the threshold value is not exceeded, the measurement result [S2i] determined at Step TT4 is stored in the memory of the visual sensor controller, the robot controller is notified of the measurement result, and the processing is completed. In the robot controller, using the robot position observed when the [S2i] was determined, the operation position/orientation [P2] of the robot (e.g., the robot position suited to grasping) for the workpiece located at an arbitrary position [W2] is calculated in accordance with the following formulae:

$$[W2i]=[F2i][T][S2i] \quad \text{(B12)}$$

$$[P2]=[W2i][W1']^{-1}[P1] \quad \text{(B13)}$$

Figure 5:
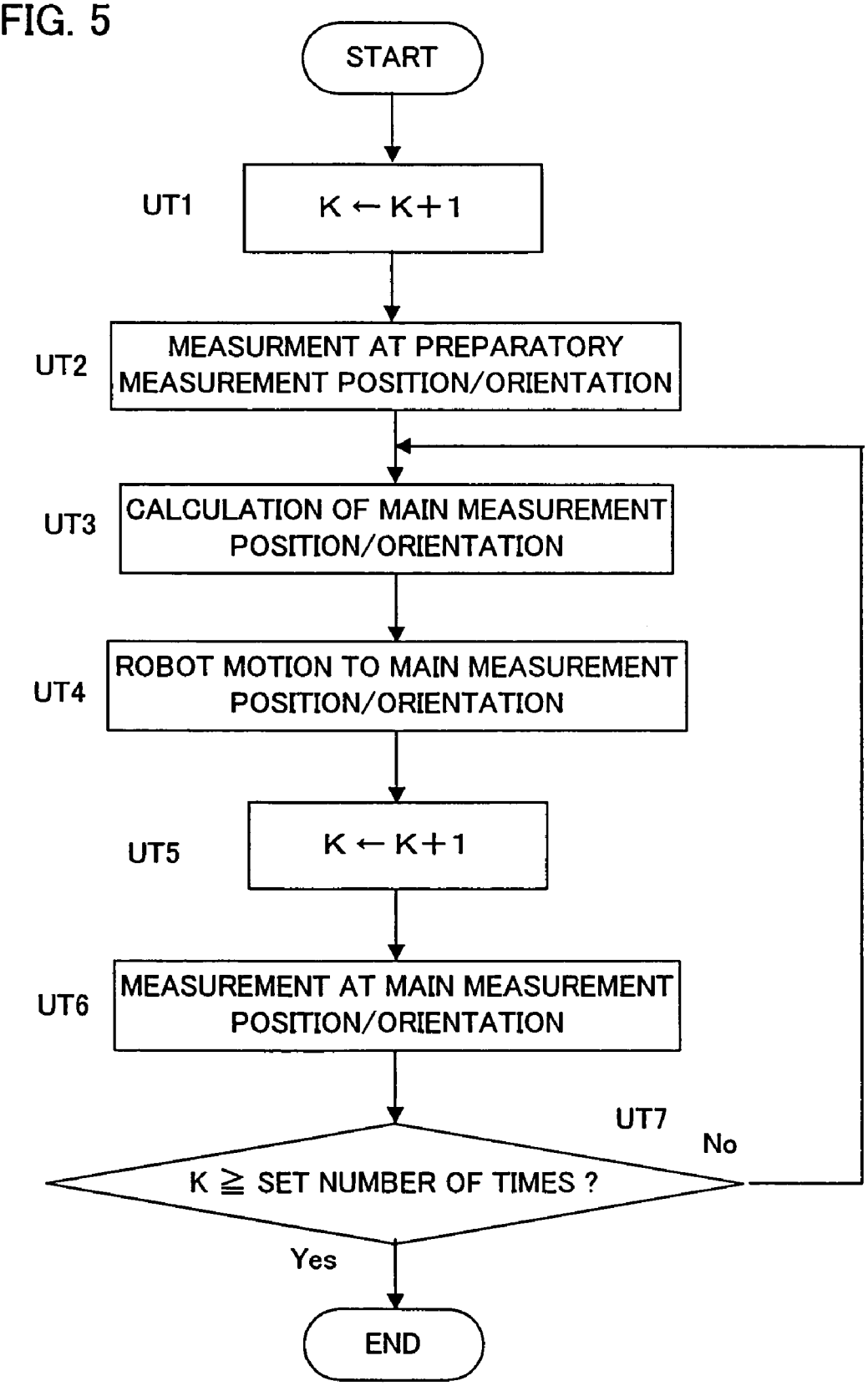
FIG. 5 is a flowchart of another example of modified processing procedures in the embodiment, in which the calculation of the main measurement position is repeated.

With the above procedures, the measurement for the workpiece can be carried out with high accuracy. Instead of the error evaluation at Step TT5, a processing cycle may be made a predetermined number of times. Procedures therefor is shown in the flowchart of FIG. 5. The following is a brief explanation of main points of respective steps (in which explanations on the calculation of main measurement position is omitted).

In Step UT1, an initial setting of an index K for number of times is made (K=1).

In Step UT2, as in the Step ST1, the robot is moved to a preparatory measurement position, and a preparatory measurement for the workpiece located at [W2] is carried out. The preparatory measurement position may be set in advance in the robot controller.

In Step UT3, basically as in the Step ST2, a measurement position (a robot position for main measurement) is calculated. The K-th main measurement position is referred to as [F2k] (the main measurement position calculated by the K-th calculation).

In Step UT4, the robot is moved to the main measurement position determined at Step UT3.

In Step UT5, the index K of number of times is incremented by 1.

In Step UT6, a measurement for the workpiece is made at the main measurement position. A measurement result is referred to as [S2K].

In Step UT7, whether a preset number of times is reached is checked, and, if the preset number of times is not reached, the flow returns to Step UT3. If the preset number of times is reached, the measurement result obtained at Step UT5 is stored in the memory of the visual sensor controller, and the robot controller is notified of the measurement result, whereupon the processing is finished. In the robot controller, using the robot position observed at the main measurement position, operation position/orientation of the robot (i.e., a robot position suited to grasping) for the workpiece which is at an arbitrary position is calculated.

Figure 6:
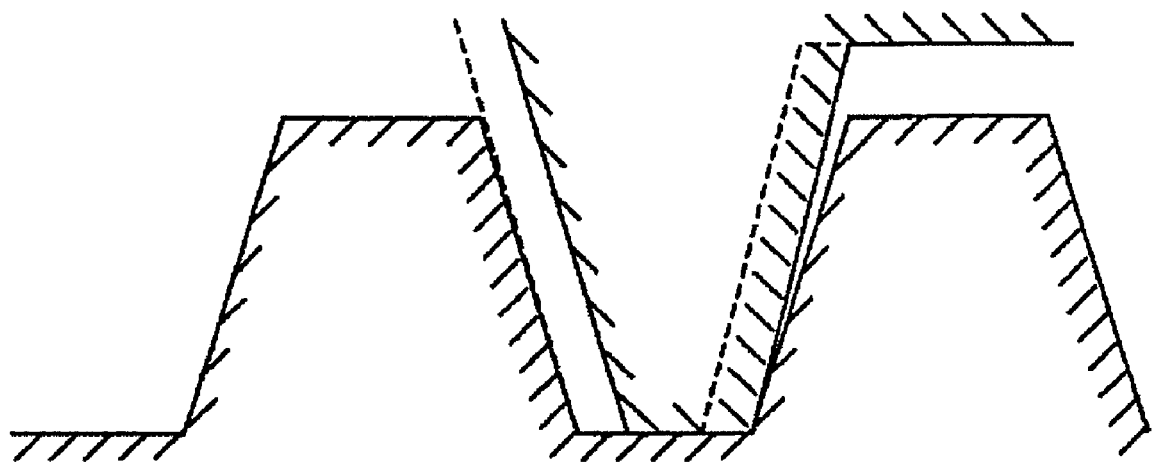
FIG. 6 is a view showing a model for explaining adverse effects of backlash in a robot axis.

Here, a case is considered where backlash in the robot is taken into consideration. The backlash in the robot can be represented by a model shown in FIG. 6, in which a motor is coupled to a robot arm through a motor gear, a transmission gear meshing therewith, and the like, and a clearance or backlash is present between the motor and transmission gears. According to this model, even at the same motor rotary position, there is a possibility that the moved position of the robot arm end, changes from time to time depending on which of the right and left sides in FIG. 6, the gear teeth are engaged at.

For this reason, even at the same numerically expressed measurement position, if the actual measurement position differs, the visual sensor output includes a corresponding error so that an accurate output cannot be attained. On the other hand, adverse effects of the backlash in the robot can be reduced by rotating the motor for the measurement always in the same direction so that the gear teeth engagement is always made on the same side. Procedures for achieving this in the aforementioned basic type are shown in the flowchart of FIG. 7. The following are main points in respective steps, with explanations on the calculation of the main measurement position omitted.

In Step VT1, as in the Step ST1, the robot is moved to a preparatory measurement position, and a preparatory measurement for the workpiece located at [W2] is performed. The preparatory measurement position may be set in advance in the robot controller.

In Step VT2, basically as in the Step ST2, a main measurement position is calculated.

In Step VT3, an auxiliary position is calculated. The auxiliary position is determined so as to satisfy the requirement that the robot motion to the calculated main measurement position is achieved by rotating each individual drive axis of the robot in one direction, without being reversed during the robot motion. Such auxiliary position can be determined by determining operations of the respective axes from the main measurement position, by adding up, an appropriate number of times, minute displacements of the same sign for every axis.

In Step VT4, the robot is moved to and temporally positioned at the auxiliary position determined at Step VT3.

In Step VT5, the robot is moved to the main measurement position determined at Step VT2.

In Step VT6, a measurement for the workpiece is carried out at the main measurement position. A measurement result is stored in the memory of the visual sensor controller, and the robot controller is notified of the measurement result. Then, the processing is finished. In the robot controller, using a robot position observed at the main measurement position, an operation position/orientation of the robot (e.g., a robot position suited to grasping) for the workpiece located at an arbitrary position is calculated.

The procedures described above can be repeated in the aforementioned manner. In that case, Steps VT2–VT6 are repeated where required.

As explained above, the present invention makes it possible to minimize the error in coupling the sensor coordinate system and the robot coordinate system as well as adverse effects of error in robot position caused by backlash, irrespective of the positional relation between the robot and the workpiece at the initial measurement, by performing or repeatedly performing the preparatory measurement, whereby a highly accurate robot operation can be achieved.

What is claimed is:

1. A three-dimensional measuring device for measuring a position/orientation of an object using a three-dimensional visual sensor mounted on a robot, comprising:

storing means for storing a target relative measurement position/orientation of the visual sensor and the object in advance;

control means for controlling the robot to position the visual sensor at a preparatory measurement position/orientation where a preparatory measurement is performed by the visual sensor to obtain a relative position/orientation of the visual sensor and the object; and determining means for determining a main measurement position/orientation of the visual sensor at which a relative position/orientation of the visual sensor and the object coincides with the target relative measurement position/orientation based on the relative position/orientation obtained by the preparatory measurement and the target relative measurement position/orientation stored in said storing means, wherein said control means controls the robot to position the visual sensor at the main measurement position/orientation determined by said determining means where a main measurement is performed by the visual sensor to obtain a relative position/orientation of the visual sensor and the object.

2. A three-dimensional measuring device according to claim 1, wherein said determining means determines whether or not an error between the relative position/orientation obtained by the main measurement and the target relative position/orientation is within a predetermined allowable range, and when it is determined that the error is not within the allowable range, said determining means updates the main measurement position/orientation of the visual sensor at which a relative position/orientation of the visual sensor and the object coincides with the target relative position/orientation based on the relative position/orientation obtained by the main measurement and the target relative position/orientation stored in said storing means, and said control means controls the robot to reposition the visual sensor at the updated main measurement position/orientation where an updated main measurement is performed by the visual sensor, and the update of the main measurement position/orientation and repositioning of the visual sensor are repeatedly performed until the error is within the allowable range.

3. A three-dimensional measuring device according to claim 1, wherein said determining means updates the main measurement position/orientation of the visual sensor at which a relative position/orientation of the object and the visual sensor coincides with the target relative position/orientation based on the relative position/orientation obtained by the main measurement and the target relative position/orientation stored in said storing means, and said control means controls the robot to reposition the visual sensor at the updated main measurement position/orientation where an updated main measurement is performed by the visual sensor, and the update of the main measurement position/orientation and repositioning of the visual sensor are repeatedly performed a set number of times.

4. A three-dimensional measuring device according to any one of claims 1 to 3, further comprising designating means for designating the preparatory measurement position/orientation of the visual sensor in advance.

5. A three-dimensional measuring device according to any one of claims 1 to 3, wherein the preparatory measurement position/orientation is determined based on a result of measurement performed by a visual sensor other than said visual sensor.

6. A three-dimensional measuring device according to any one of claims 1 to 3, wherein said control means controls the robot to position the visual sensor at an auxiliary position/orientation before positioning the visual sensor at the preparatory measurement position/orientation, said auxiliary position/orientation being determined such that a motion of the visual sensor from the auxiliary position/orientation to the preparatory measuring position/orientation is realized by rotating all of drive motors of the robot unidirectionally.

7. A three-dimensional measuring device according to any one of claims 1 to 3, wherein said control means controls the robot to position the visual sensor at an auxiliary position/orientation before positioning the visual sensor at the main measurement position/orientation, said auxiliary position/orientation being determined such that a motion of the visual sensor from the auxiliary position/orientation to the main measuring position/orientation is realized by rotating all of drive motors of the robot unidirectionally.

8. A three-dimensional measuring device to measure a position/orientation of an object using a three-dimensional visual sensor mounted on a robot, comprising:

a storing unit to store a target relative measurement position/orientation of the visual sensor and the object in advance;

a controller to control the robot to position the visual sensor at a preparatory measurement position/orientation where a preparatory measurement is performed by the visual sensor to obtain a relative position/orientation of the visual sensor and the object; and a determining unit to determine a main measurement position/orientation of the visual sensor at which a relative position/orientation of the visual sensor and the object coincides with the target relative measurement position/orientation based on the relative position/orientation obtained by the preparatory measurement and the target relative measurement position/orientation stored in said storage unit, wherein said controller controls the robot to position the visual sensor at the main measurement position/orientation determined by said determining unit where a main measurement is performed by the visual sensor to obtain a relative position/orientation of the visual sensor and the object.

9. A three-dimensional measuring device according to claim 8, wherein said determining unit determines whether or not an error between the relative position/orientation obtained by the main measurement and the target relative position/orientation is within a predetermined allowable range, and when it is determined that the error is not within the allowable range, said determining unit updates the main measurement position/orientation of the visual sensor at which a relative position/orientation of the visual sensor and the object coincides with the target relative position/orientation based on the relative position/orientation obtained by the main measurement and the target relative position/orientation stored in said storage unit, and said controller controls the robot to reposition the visual sensor at the updated main measurement position/orientation where an updated main measurement is performed by the visual sensor, and the update of the main measurement position/orientation and repositioning of the visual sensor are repeatedly performed until the error is within the allowable range.

10. A three-dimensional measuring device according to claim 8, wherein said determining unit updates the main measurement position/orientation of the visual sensor at which a relative position/orientation of the object and the visual sensor coincides with the target relative position/ orientation based on the relative position/orientation obtained by the main measurement and the target relative position/orientation stored in said storage unit, and said controller controls the robot to reposition the visual sensor at the updated main measurement position/orientation where an updated main measurement is performed by the visual sensor, and the update of the main measurement position/ orientation and repositioning of the visual sensor are repeatedly performed a set number of times.

11. A three-dimensional measuring device according to claim 8, further comprising a designating unit to designate the preparatory measurement position/orientation of the visual sensor in advance.

12. A three-dimensional measuring device according to claim 8, wherein the preparatory measurement position/ orientation is determined based on a result of measurement performed by a visual sensor other than said visual sensor.

13. A three-dimensional measuring device according to claim 8, wherein said controller controls the robot to position the visual sensor at an auxiliary position/orientation before positioning the visual sensor at the preparatory measurement position/orientation, said auxiliary position/orientation being determined such that a motion of the visual sensor from the auxiliary position/orientation to the preparatory measuring position orientation is realized by rotating all drive motors of the robot unidirectionally.

14. A three-dimensional measuring device according to claim 8, wherein said controller controls the robot to position the visual sensor at an auxiliary position/orientation before positioning the visual sensor at the main measurement position/orientation, said auxiliary position/orientation being determined such that a motion of the visual sensor from the auxiliary position/orientation to the main measuring position/orientation is realized by rotating all drive motors of the robot unidirectionally.

15. A three-dimensional measuring method to measure a position/orientation of an object, the method comprising:

setting a target relative orientation of a visual sensor and the object;

performing a preparatory measurement using the visual sensor to obtain a preparatory relative orientation of the visual sensor and the object; and determining a main measurement orientation of the visual sensor at which a relative orientation of the of the visual sensor and the object coincides with the target relative orientation based on the preparatory relative orientation and the target relative orientation, wherein a main measurement is performed by the visual sensor to obtain a relative orientation of the visual sensor and the object.

* * * * *

UNITED STATES PATENT AND TRADEMARK OFFICE
CERTIFICATE OF CORRECTION

PATENT NO. : 6,970,802 B2  
APPLICATION NO. : 10/740567  
DATED : December 13, 2005  
INVENTOR(S) : Kazunori Ban et al.

Page 1 of 1

It is certified that error appears in the above-identified patent and that said Letters Patent is hereby corrected as shown below:

In the Drawings sheet 3 of 7 (Drawings) in the first box, delete "MEASURMENT" and insert --MEASUREMENT-- sheet 4 of 7 (Drawings) in the first box, delete "MEASURMENT" and insert --MEASUREMENT-- sheet 5 of 7 (Drawings) in the first box, delete "MEASURMENT" and insert --MEASUREMENT-- sheet 7 of 7 (Drawings) in the first box, delete "MEASURMENT" and insert --MEASUREMENT-- column 4, line 41 delete "$[P2]=[W2][W]^{-1}[P1]$" and insert --$[P2]=[W2][W1]^{-1}[P1]$-- column 6, line 26 delete "$[P21]=[W21][W1']^{-1}[P1]$" and insert $[P2]=[W21][W1']^{-1}[P1]$-- column 12, line 18 after "of the" delete "of the"

Signed and Sealed this

Fifteenth Day of August, 2006

JON W. DUDAS  
*Director of the United States Patent and Trademark Office*

UNITED STATES PATENT AND TRADEMARK OFFICE
CERTIFICATE OF CORRECTION

PATENT NO. : 6,970,802 B2  Page 1 of 1
APPLICATION NO. : 10/740567
DATED : November 29, 2005
INVENTOR(S) : Kazunori Ban et al.

It is certified that error appears in the above-identified patent and that said Letters Patent is hereby corrected as shown below:

In the Drawings sheet 3 of 7 (Drawings) in the first box, delete "MEASURMENT" and insert --MEASUREMENT-- sheet 4 of 7 (Drawings) in the first box, delete "MEASURMENT" and insert --MEASUREMENT-- sheet 5 of 7 (Drawings) in the first box, delete "MEASURMENT" and insert --MEASUREMENT-- sheet 7 of 7 (Drawings) in the first box, delete "MEASURMENT" and insert --MEASUREMENT-- column 4, line 41 delete "$[P2]=[W2][W]^{-1}[P1]$" and insert --$[P2]=[W2][W1]^{-1}[P1]$-- column 6, line 26 delete "$[P21]=[W21][W1']^{-1}[P1]$" and insert --$[P2]=[W21][W1']^{-1}[P1]$-- column 12, line 18 after "of the" delete "of the"

This certificate supersedes Certificate of Correction issued August 15, 2006.

Signed and Sealed this

Nineteenth Day of September, 2006

JON W. DUDAS
*Director of the United States Patent and Trademark Office*